United States Patent Office 2,801,175
Patented July 30, 1957

2,801,175

PROCESS FOR TREATING WINE

Julius H. Fessler, Berkeley, Calif., assignor to Cuvinex Company, a copartnership No Drawing. Application February 26, 1954,
Serial No. 412,931

11 Claims. (Cl. 99—48)

This invention relates to a process for treating wine to prevent the wine from becoming cloudy while in a bottle or other closed container. This application is a continuation-in-part of my application Serial No. 252,803, filed October 23, 1951.

It is known that wines become cloudy under certain conditions if they are contaminated with trace amounts of copper salts. Wine picks up small amounts of copper from the equipment used during crushing, handling and storage due to contact with brass or copper. As a practical matter, it is impossible to prevent metal contact when wine is being made and the problem of the development of turbidity in wine due to the presence of copper is serious and one of long standing. The amount of copper contamination necessary to cause turbidity is very small and if the wine contains even a fraction of one part per million of copper, serious turbidity problems are encountered.

The clouding or development of turbidity in wine occurs principally while the wine is in the bottle, being brought about by the presence of copper salts in the wine which are normally in the cupric state when the wine is first bottled; when the salts are subjected to the reducing condition which occurs naturally within the bottled wine, the cupric salts are reduced to cuprous salts; materials contained in wine tend to react with oxygen very readily so that when wine is in a sealed container, a reducing condition is present in the wine. The cuprous salts are substantially less soluble than the corresponding cupric salts and therefore precipitate, giving the wine a cloudy appearance.

Although the copper is not present in sufficient amount to be a health hazard, or to detract from the palatability of the wine, consumers of wine ordinarily expect the wine to be completely clear and free from any turbidity so that the presence of copper contaminants definitely reduces the sales appeal of the wine.

A lesser problem is the presence of iron contamination in wine, and the present invention is adapted to reduce the iron content of wines. However, the invention will be described in terms of copper removal, since this is the more serious problem.

The wine industry has sought a solution to this problem for many years, but the only process which has found any acceptance in the wine industry is the so-called blue-fining process. This process has been practiced in this and many foreign countries for a number of years, but is a far from satisfactory solution to the problem because of the close control and supervision required. According to this process, the wine is treated with potassium ferrocyanide to form complex salts with the copper. To practice that process it is necessary to employ very careful analytical control, both to ensure that no more potassium ferrocyanide is used than is necessary and also to make sure that no potassium ferrocyanide is left in the finished wine. Further, it takes over a week to blue-fine a wine. It is usual to employ less than the necessary quantity of potassium ferrocyanide required for complete removal of copper to provide a margin of safety. Thus, the blue-fining process cannot remove iron and copper in their entirety, but can only reduce the metallic contaminants to the point where they are less troublesome.

It has also been proposed to reduce the copper contamination of wine by heating the wine to a temperature of about 130° F. under reducing conditions and holding the wine at this temperature for 20 or 30 days. This heat treatment reduces the cupric salts to cuprous salts, which may be filtered from the wine. This process is unsatisfactory since it requires that the wine be held at a high temperature for a long period of time which results in a high production cost and the deterioration of the wine.

It has also been suggested that insoluble ferricyanide be used in treating wine, for instance as in Patent 2,105,700.

It is an object of the present invention to provide a process for removing copper salts from wine utilizing an insoluble non-poisonous treating agent.

It is a further object of my invention to provide a method of removing copper from wine using a compound which may be safely used in excess of the actual requirement so that all of the copper can be removed from the wine.

Another object of my invention is to provide a process for treating wine which does not impart any foregin taste or odor to the wine and which does not remove from the wine any of the substances which contribute to the natural taste and aroma of the wine.

I have discovered that the above objects can be accomplished by treating the wine with certain iron salts which are soluble or dispersible in the wine.

According to one embodiment of my invention, I prepare an aqueous mixture of ferrous sulfate and potassium ferrocyanide and an alkali, such as sodium hydroxide. In the presence of the sodium hydroxide, the potassium ferrocyanide cannot react with the ferrous sulfate or ferrous hydroxide to form insoluble ferrocyanides. However, as is well-known, wine is acidic, and when such a mixture is added to wine, the acidity of the wine neutralizes the alkali, the potassium ferrocyanide reacts with metallic contaminants in the wine and the ferrous iron in the mixture to form an insoluble complex. The wine may then be decanted, filtered or centrifuged to remove the complex, leaving the wine free of troublesome metallic contamination.

In accordance with another embodiment of this invention, the ferrous sulfate and potassium ferrocyanide are caused to react to form a paste and the paste is added to the wine. After thorough mixing, the solid material can be removed from the wine by filtration, leaving the wine substantially free of metallic contamination.

A mixture of aqueous solutions of ferrous sulfate, alkali and potassium ferrocyanide forms a precipitate which settles out, leaving a supernatant liquid. Such a mixture is suitable for use in fining a wine if it is well stirred before a portion of the mixture is added to the wine. However, if the proportions between the solid and liquid phase are not maintained, e. g., as by using a disproportionate part of the supernatant liquid in fining a wine, an undesirable condition might be produced. Therefore, I prefer to include a dispersing agent, ensuring that the ferrous iron present is uniformly distributed throughout the body of the treating agent. With such a mixture, the possibility of adding the reagents in other than the proper relative proportions is eliminated. Any dispersing agent which accomplishes this function, which is insoluble in wine, and which does not impart any foregin taste or odor to the wine may be used. My preferred dispersing agent is bentonite, which may be calcined or uncalcined. Other suitable dispersing agents are casein, agar-agar, gelatin, egg albumin (including similar proteinaceous substances from animal or vegetable sources) and isinglass. In the case of bentonite, a suitable quantity is about equal the weight of the ferrous compound present.

In addition to the ferrous sulfate, I have found it is often advantageous to employ ferric sulfate in admixture therewith. The use of a mixture of the ferrous and ferric compounds causes the reaction to go somewhat faster. However, the ferric salt alone would not prevent the wine from being over fined. If ferric sulfate is used, I prefer to replace only a portion, preferably about one-third, of the ferrous sulfate with this compound. The most favorable reaction speed appears to be secured when this ratio is employed, and although a greater proportion of ferric sulfate may be used, no advantage is gained thereby.

One can employ any ferrous or ferric salt and any alkali hydroxide to prepare the ferrous mixture or the ferrous-ferric mixture providing the iron salt and alkali hydroxide source do not result in a salt being formed which is undesirable in the wine or which otherwise interferes with the fining. For instance, one can employ ferrous chloride or a mixture of ferrous and ferric hydroxides.

As is apparent from the above, the sole function of the sodium hydroxide, or other alkali, is to provide an alkaline medium wherein the ferrous or ferric salt or mixture does not react with the potassium ferrocyanide prior to the mixture being added to the wine. The quantity of alkali used is such that a solution of the ingredients has a pH of at least 7 and preferably from 9 to 10. No harm will result if an excess of alkali is used, so long as the excess is not sufficient to make the entire body of wine alkaline when the mixture is added to a batch of wine. One can eliminate the use of the alkali if the ferrous iron compound is first dispersed in the wine and the potassium ferrocyanide then added to the wine. One can also mix the potassium ferrocyanide and the ferrous salt as dry finely divided materials and then add such dry uniform mix to the wine, stirring to ensure adequate distribution of the dry materials in the wine. A dispersing agent may be present in the dry mixture.

One manner of carrying out the invention is to add potassium ferrocyanide in substantially stoichiometric quantities to ferrous sulfate in the presence of water to produce the compound potassium iron II hexacyano iron II. This is produced in accordance with the following reaction:

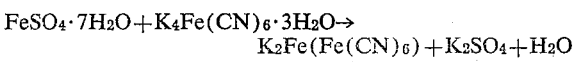

$$FeSO_4 \cdot 7H_2O + K_4Fe(CN)_6 \cdot 3H_2O \rightarrow K_2Fe(Fe(CN)_6) + K_2SO_4 + H_2O$$

Although the reactants may be added in stoichiometric amounts, some departure from this ratio may be advantageous, particularly when it is desired to produce a treating agent which will remove both copper and iron from wine. Thus, the stoichiometric quantities, in theory, are 100 parts of potassium ferrocyanide to 65.8 parts of ferrous sulfate. However, the preferred treating agent is made by reacting about 62 parts by weight of ferrous sulfate with 100 parts of potassium ferrocyanide.

To carry out the process, it is preferable first to determine the quantity of copper which is present in wine and then add to the wine the amount of the treating agent which is necessary to remove this copper. About ten ounces of potassium ferrocyanide, with proportional quantities of the other agents as outlined above, per thousand gallons of wine to be treated for each part per million of copper contained by the wine will yield satisfactory results although smaller or larger quantities may be used. For instance, to treat a thousand gallons of wine which contains two parts per million of copper by weight, one may add to the wine a composition containing about twenty ounces of potassium ferrocyanide. Since wines usually contain various complex organic compounds of a colloidal or amorphous nature which react with the potassium ferrocyanide and which cause turbidity when the wine is heated or cooled, it is generally desirable to add sufficient reagent to provide, on the average, ten ounces of potassium ferrocyanide per part of copper per thousand gallons of wine. In some instances, it may be preferable to treat the wine with an arbitrarily large amount of the treating agent rather than analyzing the wine to determine the minimum quantity which can be used. Since wines rarely contain over about 14 parts per million of copper, satisfactory results will be obtained with substantially all wines if a mixture containing 150 ounces of potassium ferrocyanide with proportional quantities of the other agents per thousand gallons is used.

The following non-limiting examples illustrate preferred methods of practicing my invention.

*Example 1.*—It was desired to treat a 1,000 gallon lot of wine which was known to contain two parts per million by weight of copper. A ferrous sulfate solution was prepared containing 140 grams of ferrous sulfate ($FeSO_4 \cdot 7H_2O$) per liter. A potassium ferrocyanide solution was prepared containing 141,75 grams of potassium ferrocyanide ($K_4Fe(CN)_6 \cdot 3H_2O$) per liter. A sodium hydroxide solution was prepared which contained 650 grams of sodium hydroxide per liter. The treating agent was prepared by adding 100 parts of the potassium ferrocyanide solution, 90 parts of the ferrous sulfate solution and 2.4 parts of the sodium hydroxide solution to 200 parts of a suspension containing 5% bentonite in water. Four gallons of the composition was then added to the wine. After thorough mixing, the wine was immediately filtered and bottled. The treated wine did not develop turbidity in the bottles after several months' storage, and analysis showed that the wine was free of copper contamination.

*Example 2.*—A 1,000 gallon lot of wine was found to contain 3 parts per million by weight of copper. A treating agent was prepared as in Example 1, with the exceptions that a ferric sulfate solution was prepared containing 126 grams per liter of ferric sulfate containing approximately nine moles of water per mole of ferric sulfate. Instead of using 90 parts of the ferrous sulfate solution, I used 60 parts of the ferrous sulfate solution and 30 parts of the ferric sulfate solution. Citric acid was added to the treating agent, thus produced at the rate of 19 grams per gallon of the mixture. Twelve gallons of the treating agent so prepared were added to the 1,000 gallon lot of wine and the mixture was agitated to ensure that the agent contacted the entire body of wine. The wine was immediately filtered and it was found upon analysis that the wine was free of copper contamination.

In the above examples, the quantity of the ferrous sulfate solution of Example 1 and the ferri-ferrous sulfate solution can be reduced if desired; for example, I have used successfully a solution under the same conditions as set forth in Example 1 but containing only 65 parts of ferrous sulfate solution; in fact, this can be reduced to as little as 50 parts and can be increased to 100 parts. In practical winery operation, one should use about two gallons of the preparation of Example 1 per thousand gallons of wine for each part of copper per million present.

The amount of sodium hydroxide or other alkali may be varied within wide limits. Thus, although I have shown in Example 1 the use of 2.4 parts of the solution, the quantity could be increased to 10 parts or reduced to 2.

*Example 3.*—A treating agent was made by combining 162 pounds of $H_2O$, 100 pounds of potassium ferrocyanide and 62 pounds of ferrous sulfate. This mixture reacted to form a thick paste. It was found that with this treating agent, one pound of the agent would remove one part per million of copper from 1,000 gallons of wine. A lot of 1,000 gallons of wine was found to contain 2.5 p. p. m. of copper. A small portion, about three gallons, of wine was withdrawn from the lot and thoroughly mixed with 2.5 pounds of the treating agent to make an easy flowing liquid. This liquid was then added to the tank of wine while the wine was being circulated. As soon as the liquid was thoroughly mixed, the wine was filtered and analyzed. It was found that the wine was completely free of copper or treating agents.

Wide latitude is possible with respect to the amount of water present in the treating agents.

Although the invention has been described as it has been utilized particularly upon wine, it is useful in treating fruit juices, vinegar, brandy, whiskey and the like which contain copper and irrespective of the quantity of iron present.

In blue-fining, all the copper cannot be removed; further, in those instances wherein the iron content is low as compared to copper, the blue-fining treatment is not fully effective.

I claim:

1. A process for treating wine containing metallic contamination to remove at least a portion of said contamination, comprising adding to the wine an aqueous alkaline potassium ferrocyanide solution containing a ferrous compound suspended therein whereby said potassium ferrocyanide and at least a portion of said metallic contamination are rendered insoluble and thereafter separating the wine from the material added thereto and at least a portion of said metallic contamination.

2. As a new composition of matter an aqueous alkaline solution of potassium ferrocyanide having a ferrous compound suspended therein with sufficient of a bodying agent to hold the ferrous compound in suspension, the ferrous compound being sufficient to react with all of the ferrocyanide and to convert the ferrocyanide to an insoluble compound upon acidification of the composition.

3. A process for treating wine containing a metallic contamination, comprising adding to the wine an aqueous alkaline solution of potassium ferrocyanide and a quantity of an iron compound selected from the group consisting of iron salts and ferrous hydroxide sufficient to form an insoluble complex with all of the potassium ferrocyanide and to complex at least a portion of said metallic contamination and separating all of said material added to the wine and at least a portion of the metallic contamination from the wine.

4. The process of claim 3 in which the iron compound is ferrous sulfate.

5. The process of claim 3 in which the iron compound is ferrous hydroxide.

6. The process of claim 3 in which the iron compound is a mixture of a ferrous and a ferric salt, the ratio of the ferrous to the ferric salt being at least 2 to 1.

7. A process for treating wine comprising preparing an aqueous solution containing potassium ferrocyanide, ferrous sulfate and an alkali, the quantity of ferrous sulfate being sufficient to react with the potassium ferrocyanide, and the quantity of alkali being sufficient to give the mixture a pH of at least 7, adding said mixture to wine to produce an insoluble complex, and separating the complex from the wine.

8. The process of claim 7 wherein the pH of the mixture is from 9 to 10.

9. A treating agent for wine comprising a mixture containing about 100 parts of an aqueous solution containing about 141.75 grams of potassium ferrocyanide per liter, from about 50 to 100 parts of an aqueous solution containing 140 grams of ferrous sulfate per liter and from about 2 to about 10 parts of an aqueous solution containing 650 grams of sodium hydroxide per liter.

10. As a new composition of matter, the reaction product produced by combining 162 parts of water, 100 parts of potassium ferrocyanide and 62 parts of ferrous sulfate, all proportions being by weight.

11. A process for treating wine comprising adding to the wine a reaction product made by combining 162 parts of water, 100 parts of potassium ferrocyanide and 62 parts of ferrous sulfate, thoroughly mixing said reaction product with the wine and filtering the wine.

References Cited in the file of this patent

UNITED STATES PATENTS

| | | |
|---|---|---|
| 2,105,700 | Ramage | Jan. 18, 1938 |
| 2,105,701 | Ramage | Jan. 18, 1938 |
| 2,306,618 | Fessler | Dec. 29, 1942 |

OTHER REFERENCES

Ind. & Eng. Chem., vol. 9, p. 83, February 15, 1937, pages 83 and 84.